(12) United States Patent
Horton et al.

(10) Patent No.: US 8,777,322 B2
(45) Date of Patent: Jul. 15, 2014

(54) CHILD-RESTRAINT HARNESS FOR JUVENILE VEHICLE SEAT

(75) Inventors: William R Horton, Hope, IN (US); David Amirault, Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 444 days.

(21) Appl. No.: 13/021,475

(22) Filed: Feb. 4, 2011

(65) Prior Publication Data

US 2011/0285187 A1    Nov. 24, 2011

(30) Foreign Application Priority Data

Apr. 14, 2010    (CN) ...................... 2010 2 0163836 U (51) Int. Cl.
*B60R 22/02* (2006.01)
*A47D 15/00* (2006.01)
(52) U.S. Cl.
USPC ...................... 297/482; 297/484; 297/216.11
(58) Field of Classification Search
USPC .................. 297/216.11, 250.1, 410, 484, 482
See application file for complete search history.

(56) References Cited

U.S. PATENT DOCUMENTS

| | | | | |
|---|---|---|---|---|
| 4,762,369 | A | * | 8/1988 | Nicod ........................... 297/484 |
| 6,030,047 | A | * | 2/2000 | Kain .............................. 297/484 |
| 6,152,525 | A | * | 11/2000 | Carine et al. ............. 297/216.11 |
| 6,471,298 | B2 | | 10/2002 | Carine et al. |
| 6,863,350 | B1 | | 3/2005 | McCulley et al. |
| 7,086,695 | B2 | * | 8/2006 | Hosoya ..................... 297/256.16 |
| 7,350,862 | B2 | * | 4/2008 | Fransen et al. ............. 297/250.1 |
| 8,550,567 | B2 | * | 10/2013 | Biaud ........................... 297/482 |
| 2009/0256404 | A1 | * | 10/2009 | Strong et al. ............. 297/216.11 |
| 2010/0264705 | A1 | * | 10/2010 | Karremans et al. ........ 297/250.1 |
| 2011/0156469 | A1 | * | 6/2011 | Carpenter ..................... 297/482 |

* cited by examiner

*Primary Examiner* — David R Dunn
*Assistant Examiner* — Timothy J Brindley
(74) *Attorney, Agent, or Firm* — Barnes & Thornburg LLP (57) ABSTRACT

A child restraint includes a juvenile seat and a child-restraint harness coupled to the juvenile seat. The juvenile seat includes a seat bottom and a seat back extending upwardly from the seat bottom. The juvenile seat also includes a headrest mounted for up-and-down movement on the seat back relative to the seat bottom.

30 Claims, 6 Drawing Sheets

FIG. 8

CHILD-RESTRAINT HARNESS FOR JUVENILE VEHICLE SEAT

PRIORITY CLAIM

This application claims priority to Chinese Utility Model Application No. 201020163836.0, filed Apr. 14, 2010, which application is hereby incorporated in its entirety herein.

BACKGROUND

The present disclosure relates to child restraints, and in particular, to juvenile seats for use on passenger seats in vehicles. More particularly, the present disclosure relates to a juvenile-restraint harnesses included in juvenile seats.

SUMMARY

According to the present disclosure, a child restraint includes a juvenile seat and a child-restraint harness coupled to the juvenile seat. The juvenile seat includes a seat bottom and a seat back extending upwardly from the seat bottom.

In illustrative embodiments, the juvenile seat further includes a movable headrest and a headrest lock. The movable headrest is mounted for up-and-down movement on the seat back relative to the seat bottom. The headrest lock includes a headrest-retainer rod that moves between a locked position in which movement of the movable headrest is blocked and an unlocked position in which the movable headrest is free to move up-and-down relative to the seat back.

In illustrative embodiments, the child restraint further includes a shoulder-belt cover coupled to the headrest-retainer rod to move therewith. The shoulder-belt cover extends from a back surface of the seat back through the seat back and through the movable headrest toward an occupant sitting on the seat bottom. The shoulder-belt cover is configured to provide means for engaging an upper torso of an occupant seated and restrained in the juvenile seat by the child-restraint harness to cause movement of the upper torso of the occupant to be minimized relative to the seat back during application of an external force to the juvenile seat so that force transferred to a head of the occupant is minimized.

In illustrative embodiments, the shoulder-belt cover includes a belt receiver, a receiver anchor, and a friction pad. The belt receiver is configured to receive a shoulder belt included in the child-restraint harness therein to cause the shoulder belt to remain aligned with the shoulder-belt cover. The receiver anchor interconnects the belt receiver and the headrest-retainer rod to cause the shoulder-belt cover to move with the headrest-retainer rod and the movable headrest. The friction pad is coupled to an inner surface of the belt receiver so that the friction pad is positioned to lie between the belt-receiver and the upper torso of the occupant.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
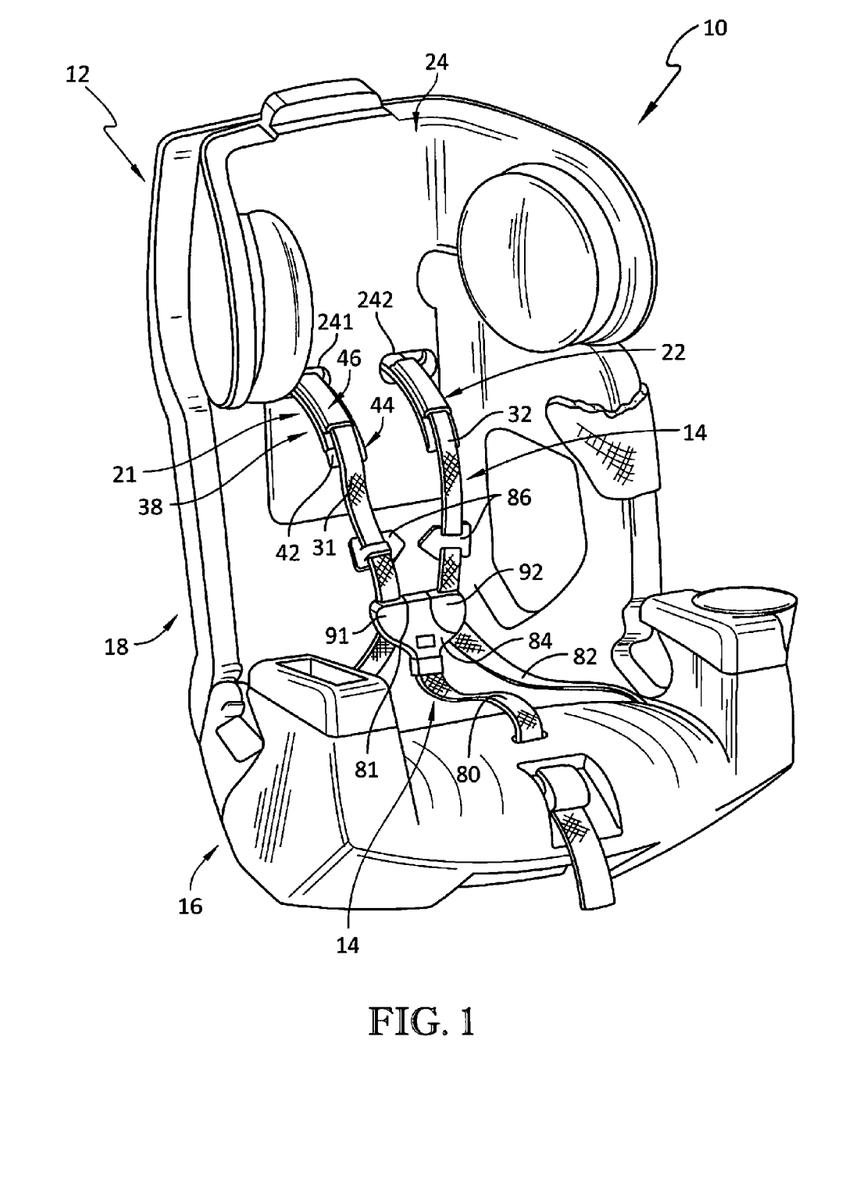
FIG. 1 is a perspective view of a child restraint in accordance with the present disclosure for use on a passenger seat in a vehicle, with portions of the fabric covering broken away, showing a juvenile seat including a seat bottom and a seat back and a child-restraint harness coupled to the seat bottom and seat back and configured to restrain a child sitting in the juvenile seat, and showing that first and second shoulder belts included in the restraint harness are arranged to pass through companion first and second shoulder-belt covers that are coupled to the juvenile seat.

An illustrative child restraint 10 in accordance with the present disclosure comprises a juvenile seat 12, a child-restraint harness 14, and first and second shoulder-belt covers 21, 22 as shown, for example, in FIG. 1. Juvenile seat 12 includes a seat bottom 16, a seat back 18 extending upwardly from the seat bottom 16, and a movable headrest 24 mounted for up-and-down movement on seat back 18 relative to seat bottom 16. In illustrative embodiments, first shoulder-belt cover 21 is shown in FIGS. 5-8 and includes a belt receiver 38 receiving first shoulder belt 31 therein, a receiver anchor 40 tethering belt receiver 38 to a headrest-retainer rod 34 also included in juvenile seat 12, and a friction pad 42 mating with belt receiver 38 and contacting an occupant 20 seat in juvenile seat 12 as suggested in FIG. 5.

Figure 2:
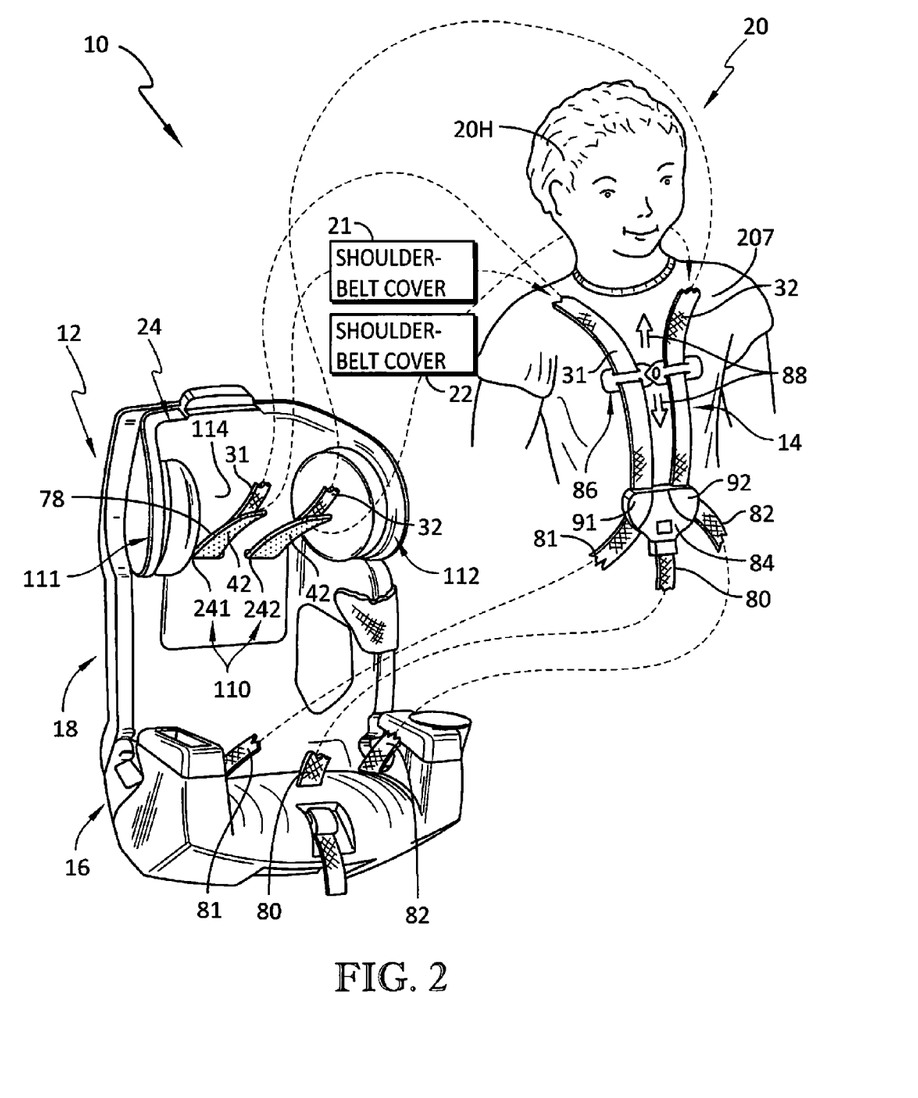
FIG. 2 is a perspective view and diagrammatic view of the child restraint of FIG. 1 suggesting that each of the shoulder belts is arranged to pass through a companion belt-receiving aperture formed in the seat back, the companion shoulder-belt cover, a harness retainer that is arranged to slide up and down along the shoulder belts, and into a belt retainer that is coupled to a crotch belt and first and second of thigh-restraint belts.

Friction pad 42 of first shoulder-belt cover 21 is configured to engage an upper torso 20T of a child 20 sitting on juvenile seat 12 and restrained by child-restraint harness 14 as suggested in FIG. 2. During application of an external force to juvenile seat 12, child 20 may slide away from seat back 18 until child 20 contacts and is restrained by shoulder belts 31, 32 of child-restraint harness 14. Sliding movement of child 20 relative to seat back 18 is minimized as a result of coupling first shoulder-belt cover 21 to headrest-retainer rod 34 and arranging friction pad 42 to engage frictionally upper torso 20T of child 20. During application of the external force, movement of child 20 is minimized because child 20 engages first shoulder-belt cover 21 prior to contacting and being restrained by first shoulder belt 31.

Figure 6:
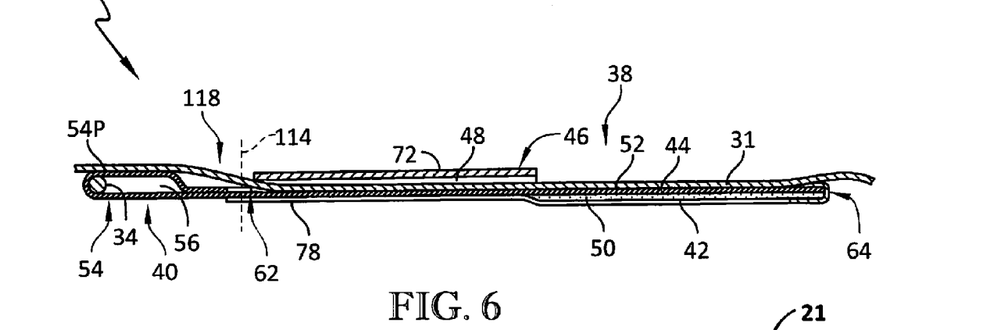
FIG. 6 is a sectional view taken along line 6-6 of FIG. 5 showing a route path of the shoulder belt relative to the shoulder-belt cover.
Figure 8:
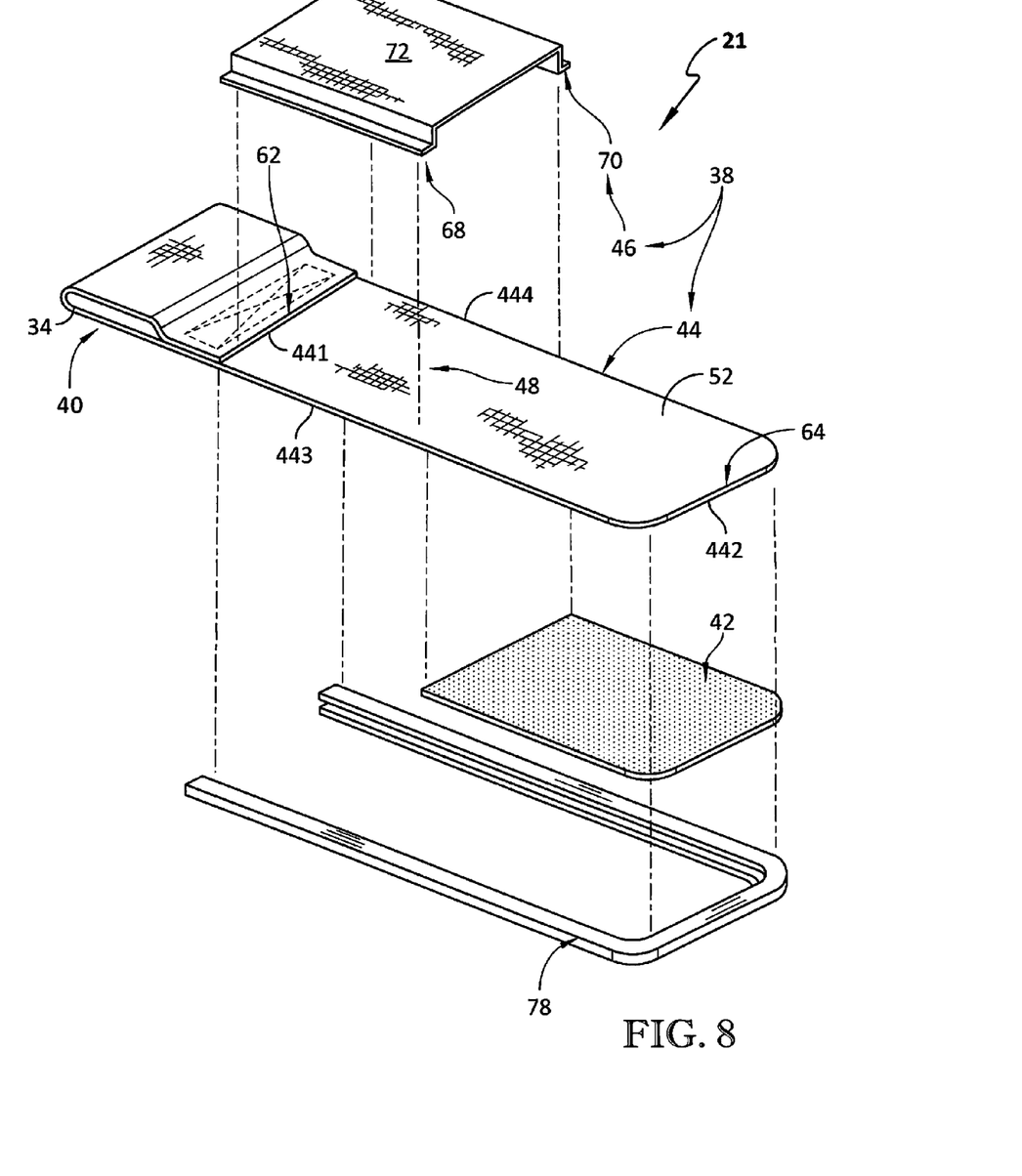
FIG. 8 is an exploded perspective assembly view of the shoulder-belt cover of FIGS. 5-6 showing that the shoulder-belt cover includes, from top to bottom, a belt-travel guide, the receiver anchor (left side), a belt-support foundation (right side), the friction pad, and a perimeter binding.

First shoulder-belt cover 21 includes belt receiver 38, receiver anchor 40, and friction pad 42 as shown in FIG. 8. Belt receiver 38 includes an inner surface 50 that is arranged to face toward child 20 and an outer surface 52 that is arranged to face opposite inner surface 50. Friction pad 42 is coupled to inner surface 50 so that friction pad 42 is located between upper torso 20T of child 20 and belt receiver 38. First shoulder belt 31 is arranged to lie in confronting relation with outer surface 52 of belt receiver 38 as shown in FIG. 6. Routing of first shoulder belt 31 causes friction pad 42 to be aligned below first shoulder belt 31 to cause force imparted onto child 20 by shoulder belt 31 to be directed through shoulder-belt cover 21.

Figure 3:
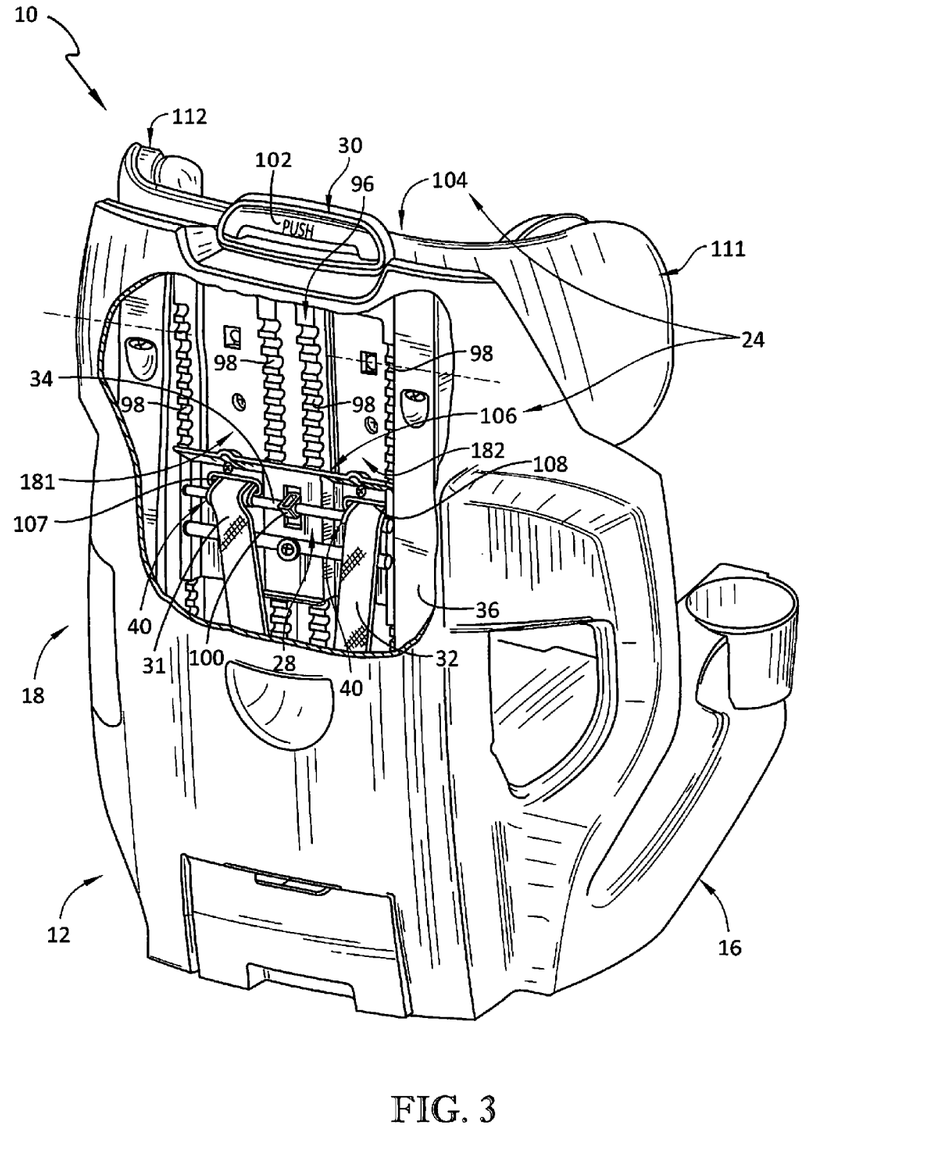
FIG. 3 is a rear perspective view of the child restraint of FIGS. 1 and 2 showing that each shoulder-belt cover is coupled to a headrest-retainer rod included in a headrest lock that selectively blocks up-and-down movement of a movable headrest relative to the seat back and showing that each shoulder belt is arranged to extend through the movable headrest around and over the shoulder-belt cover that is coupled to the headrest-retainer rod.

Receiver anchor 40 is coupled to headrest-retainer rod 34 on a back side of seat back 18 as shown, for example, in FIG. 3. Receiver anchor 40 extends from a back surface 36 of seat back 18 through seat back 18 to interconnect belt receiver 38 to headrest-retainer rod 34. Headrest-retainer rod 34 is configured to selectively retain movable headrest 24 in a fixed position above seat bottom 16. As movable headrest 24 moves up and down relative to seat back 18, headrest-retainer rod moves therewith, and as a result, first shoulder-belt cover 21 also moves therewith. When movable headrest 24 moves from a first vertical position above seat bottom 16 to a different second vertical position above seat bottom 16, first shoulder-belt cover 21 moves with movable headrest 24 so that first shoulder-belt cover 21 remains aligned below first shoulder belt 31 and remains engaged with upper torso 20T of child 20.

Movable headrest 24 is mounted on seat back 18 for up-and-down movement relative to seat bottom 16 so that occupants of various sizes may sit on juvenile vehicle seat 12. Child-restraint harness 14 is coupled to juvenile seat 12 such that first and second shoulder belts 31, 32 are routed through companion belt-receiving slots 241, 242 formed in movable headrest 24. As an example, movable headrest 24 moves upwardly to accommodate a larger child. Shoulder belt cover 21 also moves with movable headrest 24 so that shoulder-belt cover 21 is at an appropriate vertical position above seat bottom 16 to remain in engagement with upper torso 20T of child 20. At the same time, shoulder belt 31 moves freely through first belt-receiving slot 241 and through first shoulder-belt cover 21 so that a length of first shoulder belt 31 is increased without interfering with the positioning and engagement of upper torso 20T of child 20 by first shoulder-belt cover 21.

Figure 4:
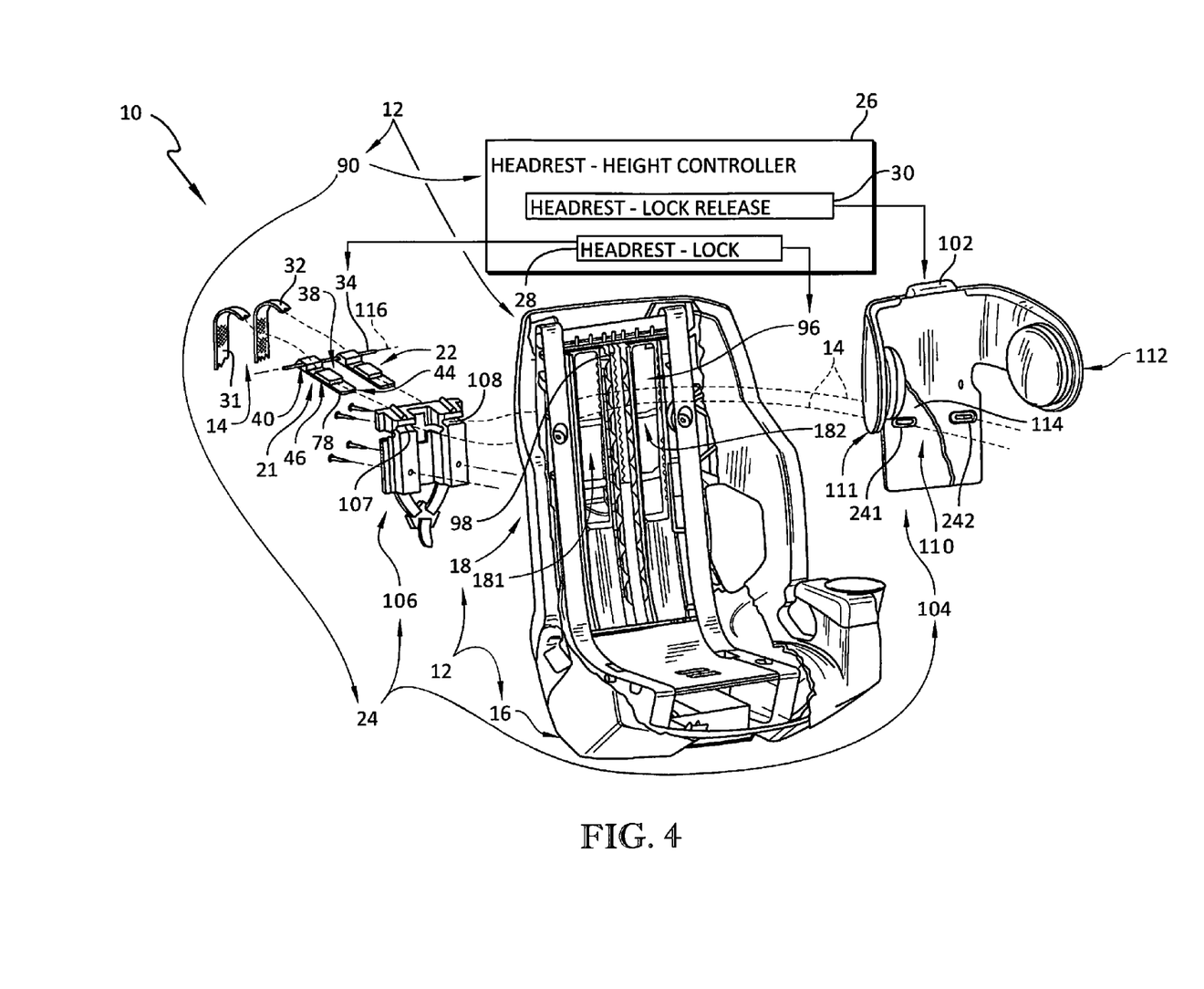
FIG. 4 is an exploded perspective assembly view and diagrammatic view of the child restraint of FIGS. 1-3 showing, from left to right, that the child restraint includes first and second shoulder belts that are arranged to pass through first and second shoulder-belt covers (to the right) that are coupled to the headrest-retainer rod which is included in the headrest lock, a slidable cradle retainer included in the movable headrest that is configured to receive the first and second shoulder belts and the companion first and second shoulder-belt covers, the juvenile seat, a headrest-height controller configured to control movement of the movable headrest, and a head cradle configured to mate with the cradle retainer to move selectively up and down therewith relative to the seat back.

Seat back 18 of juvenile seat 12 is formed to include first belt-travel channel 181 as shown, for example, in FIGS. 3 and 4. Movable headrest 24 is mounted on seat back 18 to cause first belt-receiving slot 241 to align with first belt-travel channel 181 so that first shoulder-belt cover 21, which is coupled to headrest-retainer rod 34, extends from headrest-retainer rod 34 through first belt-travel channel 181, and through first belt-receiving slot 241 formed in movable headrest 24. First shoulder belt 31 is configured to move freely relative to shoulder-belt cover 21 and movable headrest 24 as a result of first shoulder belt 31 being routed over headrest-retainer rod 34 and receiver anchor 40 of first shoulder-belt cover 21, through first belt-travel channel 181, through first belt-receiving slot 241 and through belt receiver 38 of first shoulder-belt cover 21. Lateral spacing between first and second shoulder belts 31, 32 is altered by sliding a harness retainer 86 up and down relative to shoulder belts 31, 32 as suggested in FIG. 2.

Child 20 sitting on juvenile seat 12 is restrained on juvenile seat 12 by child-restraint harness 14 as suggested in FIG. 2. Child-restraint harness 14 illustratively includes first and second shoulder belts 31, 32. Shoulder-belt covers 21, 22 are coupled to juvenile seat 12 and are configured to provide means for engaging upper torso 20T of child 20 restrained by shoulder belts 31, 32 to cause movement of upper torso 20T of child 20 to be minimized relative to seat back 18 during application of external force to juvenile seat 12 so that force transferred to a head 20H of child 20 is minimized.

Movable headrest 24 moves up and down on seat back 18 relative to seat bottom 16 in response to use of a headrest-height controller 26 included in juvenile seat 12 as suggested in FIG. 4. Headrest-height controller 26 includes a headrest lock 28 and a headrest-lock release 30 as shown diagrammatically in FIG. 4. Headrest lock 28 includes headrest-retainer rod 34 that moves from a locked position to an unlocked position when a caregiver (not shown) engages headrest-lock release 30. Movable headrest 24 is retained in a selected position on seat back 18 above seat bottom 16 when headrest-retainer rod 34 is in the locked position. Movable headrest 24 is freed to move up and down relative to seat back 18 when headrest-retainer rod 34 is in the unlocked position.

Each shoulder belt 31, 32 is arranged to extend upwardly along a back surface 36 of seat back 18, over headrest-retainer rod 34, and through companion belt-travel channels 181, 182 formed in seat back 18 as shown in FIG. 3. Movable headrest 24 is aligned with seat back 18 so that companion belt-receiving slots 241, 242 formed in movable headrest 24 are aligned with belt-travel channels 181, 182 so that shoulder belts 31, 32 may pass between front and rear sides of juvenile seat 12. As shown in FIG. 3 and suggested in FIG. 4, shoulder-belt covers 21, 22 are coupled to headrest-retainer rod 34 and are arranged to extend through belt-travel channels 181, 182 and through belt-receiving slots 241, 242. Shoulder belts 31, 32 extend through belt-travel channels 181, 182, belt-receiving slots 241, 242, and shoulder-belt covers 21, 22. Shoulder belts 31, 32 are permitted to move relative to shoulder-belt covers 21, 22 as movable headrest 24 is moved vertically relative to seat bottom 16. First shoulder-belt cover 21 is substantially the same as second shoulder-belt cover 22, and thus, only first shoulder-belt cover 21 will be discussed in detail.

Figure 5:
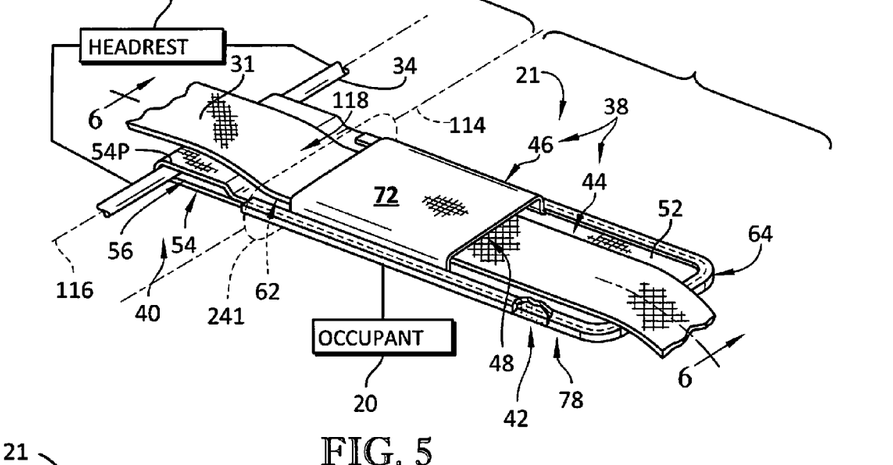
FIG. 5 is a perspective view and diagrammatic view of the first shoulder-belt cover of FIGS. 1, 2, and 4 showing that each shoulder-belt cover includes, from left to right, a receiver anchor which is formed to include a loop that is arranged to couple the shoulder-belt cover to the headrest-retainer rod included in the headrest lock and a belt receiver configured to align the shoulder belt as the shoulder belt passes through the shoulder-belt cover, and suggesting that the belt cover also includes a friction pad coupled to an inner side of the belt receiver to minimize movement of an occupant restrained in the child restraint relative to the seat back during application of an external force to the child restraint.
Figure 7:
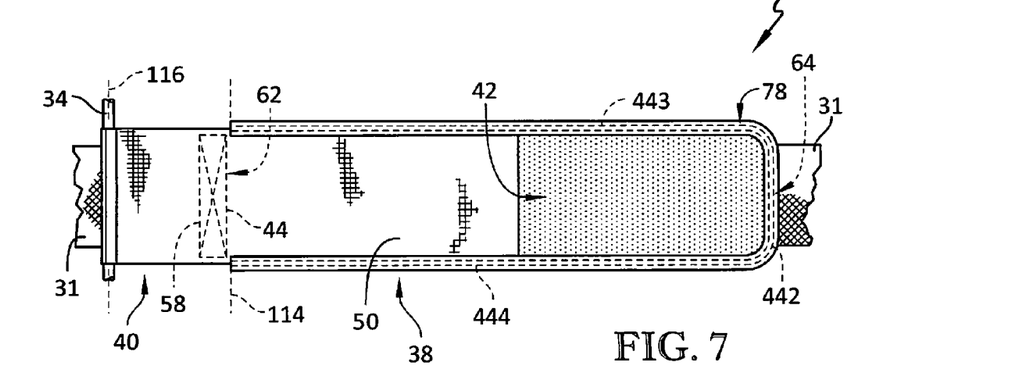
FIG. 7 is a bottom view of the of the shoulder-belt cover of FIGS. 5 and 6 showing that the friction pad is positioned to lie at a free end of the shoulder-belt cover and suggesting that the friction pad is arranged to face toward an occupant restrained by the child-restraint harness.

Shoulder-belt cover 21 includes belt receiver 38, receiver anchor 40, and friction pad 42 as shown, for example, in FIG. 8. Receiver anchor 40 is arranged to interconnect headrest-retainer rod 34 and belt receiver 38 as shown in FIGS. 5-7. Friction pad 42 is coupled to belt receiver 38 and is configured to provide means for engaging upper torso 20T of occupant 20 seated and restrained in juvenile seat 12 by child-restraint harness 14 to cause movement of upper torso 20T to be minimized relative to seat back 18 during application of an external force to juvenile seat 12. As movement of upper torso 20T is minimized, transfer of force from the external force to head 20H is minimized.

Belt receiver 38 illustratively includes a belt-support foundation 44 and a belt-travel guide 46 as shown in FIG. 8. Belt-support foundation 44 is coupled to receiver anchor 40 to move therewith and is arranged to extend outwardly away from movable headrest 24. Belt-travel guide 46 is positioned to lie in spaced-apart relation to receiver anchor 40 and is coupled to belt-support foundation 44 as shown in FIG. 5. Together, belt-support foundation 44 and belt-travel guide 46 cooperate to establish a belt-receiving channel 48. As an example, shoulder belt 31 is arranged to extend through belt-receiving channel 48 so that belt-support foundation 44 remains aligned below shoulder belt 31 between shoulder belt 31 and upper torso 20T of occupant 20 as suggested diagrammatically in FIG. 5.

Belt-support foundation 44 illustratively includes an inner surface 50 and an outer surface 52 as shown in FIGS. 5-6. Inner surface 50 is arranged to face toward occupant 20 and outer surface 52 is arranged to face in an opposite direction away from occupant 20. As shown in FIG. 6, shoulder belt 31 is arranged to lie in confronting relation with outer surface 52 of belt-support foundation 44.

Friction pad 42 is coupled to inner surface 50 and is arranged to engage occupant 20 as suggested in FIGS. 2 and 5. Friction pad 42 may be a frictional coating that is applied to a portion of inner surface 50 of belt-support foundation 44. The frictional coating may be positioned to lie in spaced-apart relation to receiver anchor 40 so that belt-travel guide 46 is located therebetween. In one illustrative embodiment, the frictional pad is silicone rubber impregnated into belt-support foundation 44. In another illustrative embodiment, the frictional pad is a silicone layer coupled to inner surface 50, but the frictional pad may be any other suitable alternative. As an example, the silicone layer may coupled to belt-support foundation 44 by adhesive, sewing, or any other suitable alternative method.

Receiver anchor 40 is coupled to belt-support foundation 44 as illustrated in FIGS. 5 and 6. Receiver anchor 40 is arranged to interconnect belt-support foundation 44 to headrest-retainer rod 34 to cause shoulder belt 31 to move back and forth in belt-receiving channel 48 relative to belt-support foundation 44. Receiver anchor 40 is formed to include a loop 54 that defines an adjuster-bar passageway 56. Receiver anchor 40 is coupled illustratively to belt-support foundation 44 by a box stitch 58, but may be coupled by any other suitable means.

Headrest-retainer rod 34 is arranged to extend through adjuster-bar passageway 56 to cause receiver anchor 40 to be coupled to headrest-retainer rod 34 as illustrated in FIG. 6 and suggested in FIG. 7. As an example, belt receiver 38 is coupled to receiver anchor 40 to move therewith back and forth relative to headrest-retainer rod 34 about a pivot axis 116. As shown in FIG. 5, pivot axis 116 is defined by headrest-retainer rod 34 and is arranged to extend through adjuster-bar passageway 56.

Belt receiver 38 illustratively includes belt-support foundation 44 and belt-travel guide 46 as shown in FIG. 8. Belt-support foundation 44 includes a first side 441, a second side 442, a third side 443, and a fourth side 444 and the four sides 441, 442, 443, 444 cooperate to establish a rectangular shape. Belt-support foundation 44 is coupled to receiver anchor 40 along first side 441 which defines a mount end 62 of belt-support foundation 44. Second side 442 is spaced-apart from first side 441 and defines a free end 64 of belt-support foundation 44. Relatively longer third side 443 is arranged to extend between and interconnect first and second sides 441, 442. Fourth side 444 is positioned to lie in spaced-apart generally parallel relation to third side 443. Fourth side 444 is also arranged to extend between and interconnect first and second sides 441, 442 as shown in FIG. 8.

Shoulder-belt cover 21, as shown in FIGS. 5 and 8, also includes a perimeter binding 78. As suggested in FIG. 8 and shown in FIG. 5, perimeter binding 78 is coupled to belt-support foundation 44 along second, third, and fourth sides 442, 443, 444. As an example, perimeter binding 78 wraps around sides 441, 442, 443 and is sewn to belt-support foundation 44, however, any other suitable method of coupling may be used. As shown in FIGS. 6 and 7, perimeter binding 78 is arranged to locate a portion of friction pad 42 between inner surface 50 of belt-support foundation 44 and perimeter binding 78. Perimeter binding 78 is configured illustratively to provide a finished appearance to shoulder-belt cover 21 and to minimize damage to outer edges of friction pad 42 due to use of shoulder-belt cover 21.

As suggested in FIG. 5 and shown in FIG. 6, belt-support foundation 44 and belt-travel guide 46 cooperate to establish belt-receiving channel 48. Belt-travel guide 46 includes a first mount 68, a second mount 70, and belt-retention ceiling 72 that cooperate with outer surface 52 of belt-support foundation 44 to define belt-receiving channel 48. First mount 68 is coupled to outer surface 52 of belt-support foundation 44 along third side 443. Second mount 70 is spaced apart from and generally parallel to first mount 68. Second mount 70 is coupled to outer surface 52 of belt-support foundation 44 along fourth side 444. Belt-retention ceiling 72 is coupled to both first and second mounts 68, 70 and is arranged to extend therebetween. Belt-retention ceiling 72 is also arranged to lie in spaced-apart relation above outer surface 52 of belt-support foundation 44.

Child-restraint harness 14 includes, for example, first and second shoulder belts 31, 32, first and second thigh-restraint belts 81, 82, and a crotch belt 80 as shown in FIGS. 1 and 2. Shoulder belts 31, 32 are arranged to pass through seat back 18 and over upper torso 20T as suggested in FIG. 2. Crotch belt 80 is arranged to extend upwardly through seat bottom 16 between thighs of occupant 20. Each thigh-restraint belt 81, 82 is arranged to extend through seat bottom 16 over thighs of occupant 20 and toward crotch belt 80. As shown in FIGS. 1 and 2, first shoulder belt 31 and first thigh-restraint belt 81 are coupled together by a first connector 91. Second shoulder belt 32 and second thigh-restraint belt 82 are coupled together by a second connector 92. Crotch belt 80 is coupled to a belt retainer 84. Belt retainer 84 is configured to selectively receive first and second connectors 91, 92 therein as shown in FIGS. 1 and 2.

Child-restraint harness 14 further includes a harness retainer 86 as suggested in FIG. 2. As an example, first and second shoulder belts 31, 32 are arranged to extend from companion belt-receiving slots 241, 242 formed in movable headrest 24, through harness retainer 86, and into companion connectors 91, 92. Harness retainer 86 slides in an up-and-down direction 88 (double arrows) relative to shoulder belts 31, 32 to maintain proper lateral spacing of shoulder belts 31, 32 relative to occupant 20 as suggested in FIG. 2.

Shoulder-belt covers 21, 22 are used to minimize movement of upper torso 20T of occupant 20 relative to shoulder belts 31, 32. Child-restraint harness 14 is adjustable to accommodate various sized occupants. As an example, movable headrest 24 may move in an upward direction away from seat bottom 16 so that a relatively larger occupant may sit on juvenile seat 12. During movement of movable headrest 24, shoulder belts 31, 32 also move therewith as a result of shoulder belts 31, 32 extending through belt-receiving slots 241, 242, through belt-travel channels 181, 182, and over headrest-retainer rod 34 that is coupled to movable headrest 24 to move therewith. After adjustment of movable headrest 24, harness retainer 86 may be used to adjust lateral positioning of shoulder belts 31, 32 on occupant 20. Harness retainer 86 may be slid upwardly to lie between shoulder belts 31, 32 and belt-support foundation 44.

Juvenile seat 12 includes seat bottom 16, seat back 18, and a head receiver 90 as shown in FIG. 4. Head receiver 90 includes movable headrest 24 and headrest-height controller 26. Movable headrest 24 is mounted on seat back 18 for up-and-down movement relative to seat bottom 16. Headrest-height controller 26 is configured to control movement and retention of movable headrest 24. As an example of use, movable headrest 24 begins in a first vertical position above seat bottom 16. A caregiver (not shown) activates headrest-height controller 26 to cause movable headrest 24 to be freed to move to a different second vertical position relative to seat bottom 16. Once movable headrest 24 is in the second vertical position, the caregiver disengages headrest-height controller 26 and movable headrest 24 is retained in the second vertical position.

Headrest-height controller 26 illustratively includes headrest lock 28 and headrest-lock release 30 as shown diagrammatically in FIG. 4. Headrest lock 28 includes a rod receiver 96 and headrest-retainer rod 34 as suggested in FIG. 4. Rod receiver 96 is coupled to back surface 36 of seat back 18 as suggested in FIG. 4 and shown in FIG. 3. Headrest-retainer rod 34 is coupled to headrest-lock release 30 to move therewith relative to rod receiver 96 and seat back 18 under the control of a caregiver to free movable headrest 24 to be raised and lowered relative to seat back 18.

Rod receiver 96 is coupled to back surface 36 of seat back 18 and is arranged to extend away from seat back 18 as shown in FIG. 3. Rod receiver 96 is formed to include a series of rod-receiving notches 98 having openings facing away from back surface 36 of seat back 18 as illustrated in FIG. 3. Each rod-receiving notch 98 is located at a different elevation above seat bottom 16 and is configured to mate with headrest-retainer rod 34.

Headrest-retainer rod 34 is arranged to move relative to rod receiver 96 between the locked position engaging a selected first of rod-receiving notches 98 of rod receiver 96 to retain movable headrest 24 in a selected position on seat back 18 to establish the elevation of movable headrest 24 above seat bottom 16 and an unlocked position disengaging rod-receiving notches 98 formed in rod receiver 96 to free movable headrest 24 for up-and-down movement relative to seat back 18 to assume a different selected fixed position on seat back 18 associated with a selected second of rod-receiving notches 98 to establish a new elevation of movable headrest 24 above seat bottom 16. Headrest-lock release 30 is configured to be operated by a caregiver so that headrest-retainer rod 34 moves toward and away from rod-receiving notches 98.

Headrest-lock release 30 includes a pivot mount coupled to movable headrest 24 and a release lever 100 as suggested in FIG. 3. Release lever 100 is mounted for movement on and relative to movable headrest 24 about a pivot axis in response to application of a force to a push handle 102 coupled to the release lever 100 by a caregiver to move headrest-retainer rod 34 in a direction away from back surface 36 of seat back 18 and relative to rod receiver 96 from the locked position to the unlocked position.

As suggested in FIG. 4, movable headrest 24 includes a head cradle 104 and a slidable cradle retainer 106. Cradle retainer 106 is coupled to head cradle 104 to move therewith relative to seat back 18 and to retain head cradle 104 in tethered relation to seat back 18 while allowing up-and-down movement of head cradle 104 relative to seat back 18.

First shoulder belt 31 of child-restraint harness 14 is arranged to extend through first belt-travel channel 181 of seat back 18 as suggested in FIGS. 3 and 4. First shoulder belt 31 is further arranged to extend through first shoulder belt-receiving slot 241 formed in head cradle 104 of movable headrest 24, as suggested in FIG. 4 and shown in FIG. 1, and through a first shoulder belt-receiving slot 107 formed in slidable cradle retainer 106 of movable headrest 24 as suggested in FIG. 4 and shown in FIG. 3.

A second shoulder belt 32 included in child-restraint harness 14 is arranged to extend through second belt-travel channel 182 of seat back 18 as suggested in FIGS. 3 and 4. Second shoulder belt 32 is further arranged to extend through second shoulder belt-receiving slot 182 formed in head cradle 104 of movable headrest 24, as suggested in FIG. 4 and shown in FIG. 1, and through a second shoulder belt-receiving slot 108 formed in slidable cradle retainer 106 of movable headrest 24 as suggested in FIG. 3.

Head cradle 104 of movable headrest 24 includes a harness-control unit 110 formed to include first and second belt-receiving slots 241, 242. Head cradle 104 also includes a first side wing 111 coupled to one side of harness-control unit 110 and a second side wing 112 coupled to an opposite side of harness-control unit 110 as suggested in FIGS. 1 and 4. Illustratively, head 20H of child 20 seated on juvenile seat 12 is positioned to lie between first and second side wings 111, 112 on harness-control unit 110.

Movable headrest 24 is mounted for up-and-down movement on seat back 18. First and second shoulder belt-receiving slots 241, 242 of harness-control unit 110 and first and second shoulder belt-receiving slots 107, 108 formed in slidable cradle retainer 106 are aligned with their companion belt-travel channels 181, 182 formed in seat back 18 as suggested in FIGS. 3 and 4. Shoulder belt-receiving slots 241, 242 formed in head cradle 104 and shoulder belt-receiving slots 107, 108 formed in slidable cradle retainer 106 operate to keep shoulder belts 31, 32 positioned at an appropriate height that corresponds to the vertical position of movable headrest 24 relative to seat back 18.

As shown in FIG. 3, shoulder-belt cover 21 is coupled to headrest-retainer rod 34 by receiver anchor 40 and shoulder-belt cover 21 is arranged to extend toward movable headrest 24. Receiver anchor 40 is coupled to mount end 62 of belt-support foundation 44. Receiver anchor 40 and belt-support foundation 44 are arranged to extend through, in order, first shoulder belt-receiving slot 107 formed in slidable cradle retainer 106, first belt-travel channel 181 formed in seat back 18, and first shoulder belt-receiving slot 241 formed in head cradle 104. Shoulder belt 31 is routed upwardly along back surface 36 of the seat back 18 over headrest-retainer rod 34 and receiver anchor 40 and then through, in order, first shoulder belt-receiving slot 107 formed in slidable cradle retainer 106, first belt-travel channel 181 formed in seat back 18, first shoulder belt-receiving slot 241 formed in head cradle 104, and belt-receiving channel 48 formed in shoulder-belt cover 21.

As suggested in FIG. 3, shoulder-belt cover 21 is coupled to headrest-retainer rod 34 to move therewith. Shoulder-belt cover 21 is also coupled to shoulder belt 31 to allow shoulder belt 31 to move relative to shoulder-belt cover 21. As an example, shoulder-belt cover 21 includes belt receiver 38, receiver anchor 40, and friction pad 42 as shown in FIG. 8.

Belt receiver 38 includes belt-support foundation 44 and belt-travel guide 46. Belt-support foundation 44 includes mount end 62 and free end 64. Mount end 62 is positioned to lie between a front surface 114 of movable headrest 24 and back surface 36 of seat back 18. Free end 64 is positioned to lie in spaced-apart relation to front surface 114 of movable headrest 24. Belt-travel guide 46 is coupled to belt-support foundation 44 between front surface 114 of movable headrest 24 and opposite free end 64 of belt-support foundation 44.

Receiver anchor 40 is coupled, for example, to headrest-retainer rod 34. Receiver anchor 40 is arranged to extend away from headrest-retainer rod 34 toward front surface 114 of movable headrest 24 to couple to belt-support foundation 44 as suggested in FIG. 3.

Belt-support foundation 44 and belt-travel guide 46 illustratively cooperate to form belt-receiving channel 48. Shoulder belt 31 is arranged to pass through belt-receiving channel 48 to cause shoulder belt 31 to be positioned to lie in confronting relation with belt-support foundation 44 and underlying friction pad 42. As shown in FIG. 6, belt-support foundation 44 includes inner surface 50 and outer surface 52 arranged to face opposite inner surface 50. Shoulder belt 31 is arranged to lie in confronting relation with outer surface 52 of belt-support foundation 44. Belt-travel guide 46 is coupled to outer surface 52 of belt-support foundation 44 and is arranged to locate shoulder belt 31 between belt-travel guide 46 and outer surface 52 of belt-support foundation 44.

Receiver anchor 40 is formed to include loop 54 as shown in FIGS. 5 and 6. Loop 54 defines adjuster-bar passageway 56 and headrest-retainer rod 34 is arranged to extend through adjuster-bar passageway 56. As a result, belt receiver 38 pivots back and forth about a pivot axis 116 that is defined by headrest-retainer rod 34 as shown in FIG. 5. As shown in FIG. 6, a portion 54P of loop 54 is positioned to lie between shoulder belt 31 and headrest-retainer rod 34.

Belt-support foundation 44 includes first side 441, second side 442, third side 443, and fourth side 444. First side 441 is located at mount end 62. Second side 442 is spaced-apart from first side 441 and is located at free end 64. Third side 443 extends between and interconnects first and second side 441, 442. Fourth side 444 is spaced-apart from and substantially parallel to third side 443.

As suggested in FIG. 8 and shown in FIGS. 5 and 7, shoulder-belt cover 21 further includes perimeter binding 78 coupled to second, third, and fourth sides 442, 443, 444 of belt-support foundation 44. In illustrative embodiments, perimeter binding 78 may be arranged to locate a portion of the friction pad 42 between perimeter binding 78 and belt-support foundation 44.

Belt-travel guide 46 includes first mount 68, second mount 70, and belt-retention ceiling 72 as shown in FIG. 8. First mount 68 is coupled to outer surface 52 of belt-support foundation 44 and is arranged to extend away from belt-support foundation 44. Second mount 70 is positioned to lie in spaced-apart parallel relation to first mount 68. Belt-retention ceiling 72 is coupled to and arranged to extend between first and second mounts 68, 70. Belt-retention ceiling 72 is positioned to lie in spaced-apart relation above outer surface 52 of belt-support foundation 44.

In accordance with the present disclosure, child restraint 10 comprises juvenile seat 12, child-restraint harness 14, and shoulder-belt cover 21. Juvenile seat 12 illustratively includes seat bottom 16, seat back 18, and movable headrest 24. Movable headrest 24 is mounted for up-and-down movement on seat back 18 relative to seat bottom 16. Juvenile seat 12 also includes headrest lock 28 that includes headrest-retainer rod 34 that is arranged to move between the locked position in which movement of movable headrest 24 is blocked and the unlocked position in which movable headrest 24 is free to move up-and-down relative to seat back 18.

Child-restraint harness 14 includes shoulder belt 31 that is arranged to extend upwardly along back surface 36 of the seat back 18. Shoulder belt 31 then extends over headrest-retainer rod 34 and through belt-travel channel 181 formed in seat back 18.

Shoulder-belt cover 21 illustratively includes belt receiver 38, receiver anchor 40, and a frictional coating 42 as suggested in FIG. 8. Belt receiver 38 includes belt-support foundation 44 and belt-travel guide 46. Belt-support foundation 44 has outer surface 52 that is arranged to lie in confronting relation with shoulder belt 31. Belt-support foundation 44 also includes inner surface 50 arranged to face opposite outer surface 52. Belt-travel guide 46 is coupled to outer surface 52 of belt-support foundation 44. Belt-support foundation 44 and belt-travel guide 46 cooperate to form belt-receiving channel 48 through which shoulder belt 31 is arranged to extend through.

Receiver anchor 40 is formed to include loop 54 that defines adjuster-bar passageway 56. As shown in FIG. 3, headrest-retainer rod 34 extends through adjuster-bar passageway 56. Belt receiver 38 is coupled to receiver anchor 40 to move therewith back and forth about pivot axis 116 that is arranged to extend through adjuster-bar passageway 56 relative to seat back 18.

Frictional coating 42 is coupled to inner surface 50 of belt-support foundation 44. Frictional coating 42 is positioned to lie spaced-apart from receiver anchor 40 so that belt-travel guide 46 is located therebetween. In an illustrative embodiment, frictional coating 42 is arranged to extend from second side 442 of belt-support foundation 44 to belt-travel guide 46 and from third side 443 to fourth side 444 of belt-support foundation 44.

As shown in FIG. 5, loop 54 of receiver anchor 40 is positioned to lie spaced-apart from belt-travel guide 46 of belt receiver 38 to define a space 118 therebetween. Front surface 114 of movable headrest 24 is arranged to lie in spaced-apart relation to back surface 36 of seat back 18 and is positioned to lie in space 118 between belt-travel guide 46 and loop 54 as suggested in FIG. 5. Mount end 62 of belt-support foundation 44 is arranged to lie between front surface 114 of movable headrest 24 and back surface 36 of seat back 18. As an example, mount end 62 is arranged to lie in space 118.

Child restraint 10 in accordance with the present disclosure comprises juvenile seat 12, child-restraint harness 14, and shoulder-belt cover 21 as suggested in FIGS. 1 and 4. Juvenile seat 12 includes seat bottom 16, seat back 18 extending upwardly from seat bottom 16, and movable headrest 24 that is mounted for up-and-down movement on seat back 18 relative to seat bottom 16. Juvenile seat 12 further comprises headrest lock 28 including rod receiver 96 and headrest-retainer rod 34. Rod receiver 96 is coupled to back surface 36 of seat back 18 and is arranged to extend away from seat back 18. Headrest-retainer rod 34 is arranged to move relative to rod receiver 96 between the locked position in which movable headrest 24 is retained in a selected position on seat back 18 above seat bottom 16 and the unlocked position in which movable headrest 24 is freed to move up-and-down relative to seat back 18 to assume a different selected fixed position on seat back 18.

Shoulder-belt cover 21 is coupled to headrest-retainer rod 34 to move therewith and to shoulder belt 31 to allow shoulder belt 31 to move relative to shoulder-belt cover 21. As an example, shoulder-belt cover 21 includes receiver anchor 40, belt receiver 38, and friction pad 42 as suggested in FIG. 4. Receiver anchor 40 is coupled to headrest-retainer rod 34 to move therewith in response to up-and-down movement of movable headrest 24. Belt receiver 38 is coupled to receiver anchor 40 to move therewith and is configured to receive shoulder belt 31 therein to cause shoulder belt 31 to align over belt-support foundation 44. Friction pad 42 is coupled to inner side 50 of belt-support foundation 44 to cause movement of upper torso 20T of occupant 20 seated and restrained in juvenile seat 12 by child-restraint harness 14 to be minimized relative to seat back 18 during application of the external force to juvenile seat 12 so that force transferred to head 20H of occupant 20 is minimized.

Belt receiver 38 includes belt-support foundation 44 and belt-travel guide 46. Belt-support foundation 44 is coupled to receiver anchor 40 and is arranged to extend away from receiver anchor 40. Belt-travel guide 46 is coupled to belt-support foundation 44 to locate shoulder belt 31 therebetween as shown in FIG. 6.

Belt-support foundation 44 includes inner surface 50 and outer surface 52. Inner surface 50 is adapted to face toward occupant 20 sitting in juvenile seat 12. Outer surface 52 is arranged to face toward shoulder belt 31 to cause shoulder belt 31 to lie in confronting relation with belt-support foundation 44. As shown in FIG. 6, friction pad 42 is coupled to inner surface 50 of belt-support foundation 44.

As shown in FIGS. 5-7, receiver anchor 40 is formed to include loop 54 which is configured to encircle headrest-retainer rod 34. Belt-support foundation 44 of belt receiver 38 is coupled to the receiver anchor and belt-travel guide 46 is coupled to the belt-support foundation 44, and the belt-travel guide 46 and the belt-support foundation 44 cooperate to define belt-receiving channel 48 through which shoulder belt 31 is arranged to extend through.

The invention claimed is:

1. A child restraint comprising
   a juvenile seat including a seat bottom, a seat back extending upwardly from the seat bottom, a movable headrest mounted for up-and-down movement on the seat back relative to the seat bottom, and a headrest lock including a headrest-retainer rod arranged to move relative to the seat back between a locked position in which the movable headrest is retained in a selected position on the seat back above the seat bottom and an unlocked position in which the movable headrest is freed to move up-and-down relative to the seat back to assume a different selected fixed position on the seat back,
   a child-restraint harness including a shoulder belt arranged to extend upwardly along a back surface of the seat back over the headrest-retainer rod, through a belt-travel channel formed in the seat back, and through a belt-receiving aperture formed in a front surface of the movable headrest, and
   a shoulder-belt cover coupled to the headrest-retainer rod to move therewith and to the shoulder belt to allow the shoulder belt to move relative to the shoulder-belt cover, wherein the shoulder-belt cover includes
   a belt receiver including a belt-support foundation and a belt-travel guide, the belt-support foundation includes a mount end positioned to lie between the front surface of the movable headrest and the back surface of the seat back and an opposite free end positioned to lie in spaced-apart relation to the front surface of the movable headrest, the belt-travel guide is coupled to the belt-support foundation between the front surface of the movable headrest and the opposite free end of the belt-support foundation,
   a receiver anchor coupled to the headrest-retainer rod to extend away from the headrest-retainer rod toward the front surface of the movable headrest to couple to the belt-support foundation, and
   a friction pad configured to provide means for engaging an upper torso of an occupant seated and restrained in the juvenile seat by the child-restraint harness to cause movement of the upper torso of the occupant to be minimized relative to the seat back during application of an external force to the juvenile seat so that force transferred to a head of the occupant is minimized.

2. The child restraint of claim 1, wherein the belt-support foundation includes an inner surface adapted to face away from the shoulder belt and the friction pad is coupled to the inner surface between the opposite free end of the belt-support foundation and the belt-travel guide.

3. The child restraint of claim 1, wherein the belt-support foundation and the belt-travel guide cooperate to form a belt-receiving channel and the shoulder belt is arranged to extend through the belt-receiving channel to cause the shoulder belt to be positioned to lie in confronting relation with the belt-support foundation.

4. The child restraint of claim 1, wherein the belt-support foundation includes an inner surface and an outer surface arranged to face opposite the inner surface and the shoulder belt is arranged to lie in confronting relation with the outer surface.

5. The child restraint of claim 4, wherein the belt-travel guide is coupled to the outer surface of the belt-support foundation and is arranged to locate the shoulder belt between the belt-travel guide and the outer surface of the belt-support foundation.

6. The child restraint of claim 5, wherein the receiver anchor is formed to include a loop defining a retainer-bar passageway and the headrest-retainer rod is arranged to extend through the retainer-bar passageway to cause the belt receiver to pivot back and forth about a pivot axis defined by the headrest-retainer rod.

7. The child restraint of claim 6, wherein a portion of the loop included in the receiver anchor is positioned to lie between the shoulder belt and the headrest-retainer rod.

8. The child restraint of claim 1, wherein the belt-support foundation includes a first side located at the mount end, a second side spaced-apart from the first side and located at the opposite free end, a third side extending between and interconnecting the first and the second side, and a fourth side spaced-apart from and substantially parallel to the third side.

9. The child restraint of claim 8, further comprising a perimeter binding coupled to the second, third, and fourth sides of the belt-support foundation.

10. The child restraint of claim 9, wherein the perimeter binding is arranged to locate a portion of the friction pad between the perimeter binding and the belt-support foundation.

11. The child restraint of claim 1, wherein the belt-travel guide includes a first mount coupled to an outer surface of the belt-support foundation, a second mount positioned to lie in spaced-apart parallel relation to the first mount, and a belt-retention ceiling coupled to and arranged to extend between the first and second mounts.

12. The child restraint of claim 11, wherein the belt-retention ceiling is positioned to lie in spaced-apart relation above the outer surface of the belt-support foundation.

13. The child restraint of claim 11, wherein the belt-support foundation includes a first side located at the mount end, a second side spaced-apart from the first side and located at the opposite free end, a third side extending between and interconnecting the first and the second side, and a fourth side spaced-apart from and substantially parallel to the third side, and the first mount is coupled to the belt-support foundation along the third side and the second mount is coupled to the belt-support foundation along the fourth side.

14. A child restraint comprising
- a juvenile seat including a seat bottom, a seat back extending upwardly from the seat bottom, a movable headrest mounted for up-and-down movement on the seat back relative to the seat bottom, and a headrest lock including a headrest-retainer rod arranged to move between a locked position in which movement of the movable headrest is blocked and an unlocked position in which the movable headrest is free to move up-and-down relative to the seat back,
- a child-restraint harness including a shoulder belt arranged to extend upwardly along a back surface of the seat back, over the headrest-retainer rod, and through a companion belt-travel channel formed in the seat back, and
- a shoulder-belt cover including
- a belt receiver including a belt-support foundation and a belt-travel guide, the belt-support foundation has an outer surface arranged to lie in confronting relation with the shoulder belt and an inner surface arranged to face opposite the outer surface, the belt-travel guide is coupled to the outer surface of the belt-support foundation, and the belt-support foundation and the belt-travel guide cooperate to form a belt-receiving channel through which the shoulder belt is arranged to lie in,
- a receiver anchor formed to include a loop defining a retainer-bar passageway, the headrest-retainer rod is arranged to extend through the retainer-bar passageway, and the belt receiver is coupled to the receiver anchor to move therewith back and forth about a pivot axis arranged to extend through the retainer-bar passageway relative to the seat back, and
- a frictional coating coupled to the inner surface of the belt-support foundation, wherein the frictional coating is positioned to lie in spaced-apart relation to the receiver anchor to locate the belt-travel guide therebetween.

15. The child restraint of claim 14, wherein the belt-support foundation includes a first side coupled to the receiver anchor, a second side spaced-apart from the first side and located adjacent to the frictional coating, a third side extending between and interconnecting the first and the second side, and a fourth side spaced-apart from and substantially parallel to the third side.

16. The child restraint of claim 15, wherein the frictional coating is arranged to extend from the second side of the belt-support foundation to the belt-travel guide and from the third side to the fourth side of the belt-support foundation.

17. The child restraint of claim 14, wherein the loop of the receiver anchor is positioned to lie in spaced-apart relation to the belt-travel guide of the belt receiver to define a space therebetween.

18. The child restraint of claim 17, wherein the movable headrest includes a front surface arranged to lie in spaced-apart relation to the back surface of the seat back and the front surface is positioned to lie in the space between the belt-travel guide and the loop.

19. The child restraint of claim 17, wherein the belt-travel guide extends away from a front surface of the movable headrest toward the frictional coating.

20. The child restraint of claim 17, wherein the belt-support foundation includes a mount end and a free end, the free end being positioned to lie in spaced-apart relation to the mount end, and the mount end being arranged to lie between a front surface of the movable headrest and the back surface of the seat back.

21. The child restraint of claim 20, wherein the mount end is arranged to lie in the space.

22. The child restraint of claim 21, wherein the frictional coating begins at the free end of the belt-support foundation and ends at the belt-travel guide.

23. A child restraint comprising
- a juvenile seat including a seat bottom, a seat back extending upwardly from the seat bottom, a movable headrest mounted for up-and-down movement on the seat back relative to the seat bottom, and a headrest lock including a rod receiver coupled to a rear surface of the seat back to extend away from the seat back and a headrest-retainer rod arranged to move relative to the rod receiver between a locked position in which the movable headrest is retained in a selected position on the seat back above the seat bottom and an unlocked position in which the movable headrest is freed to move up-and-down relative to the seat back to assume a different selected fixed position on the seat back,
- a child-restraint harness including a shoulder belt, and
- a shoulder-belt cover being coupled to the headrest-retainer rod to move therewith and to the shoulder belt to allow the shoulder belt to move relative to the shoulder-belt cover, wherein the shoulder-belt cover includes
- a receiver anchor coupled to the headrest-retainer rod to move therewith in response to up-and-down movement of the movable headrest,
- a belt receiver coupled to the receiver anchor to move therewith and configured to receive the shoulder belt therein to cause the shoulder belt to align with the belt receiver, and
- a friction pad coupled to the belt receiver to cause movement of an upper torso of an occupant seated and restrained in the juvenile seat by the child-restraint harness to be minimized relative to seat back during application of an external force to the juvenile seat so that force transferred to a head of the occupant is minimized.

24. The child restraint of claim 23, wherein the belt receiver includes a belt-support foundation and a belt-travel guide, the belt-support foundation is coupled to the receiver anchor and is arranged to extend away from the receiver anchor, and the belt-travel guide is coupled to the belt-support foundation to locate the shoulder belt between the belt-travel guide and the belt-support foundation.

25. The child restraint of claim 24, wherein the belt-support foundation includes an inner surface adapted to face toward an occupant sitting in the juvenile seat and an outer surface arranged to face toward the shoulder belt to cause the shoulder belt to lie in confronting relation with the belt-support foundation.

26. The child restraint of claim 25, wherein the friction pad is coupled to the inner surface of the belt-support foundation.

27. The child restraint of claim 23, wherein the receiver anchor is formed to include a loop arranged to encircle the headrest-retainer rod.

28. The child restraint of claim 27, wherein the belt receiver includes a belt-support foundation coupled to the receiver anchor and a belt-travel guide coupled to the belt-support foundation, and the belt-travel guide and the belt-support foundation cooperate to define a belt-receiving channel through which the shoulder belt is arranged to extend through.

29. A child restraint comprising
a juvenile seat including a seat bottom, a seat back extending upwardly from the seat bottom, a movable headrest mounted for up-and-down movement on the seat back relative to the seat bottom, and a headrest lock including a headrest-retainer rod arranged to move between a locked position in which movement of the movable headrest is blocked and an unlocked position in which the movable headrest is free to move up-and-down relative to the seat back,
a child-restraint harness including a shoulder belt arranged to extend upwardly along a back surface of the seat back, over the headrest-retainer rod, and through a companion belt-travel channel formed in the seat back, and
a shoulder-belt cover including
a belt receiver including a belt-support foundation and a belt-travel guide, the belt-support foundation has an outer surface arranged to lie in confronting relation with the shoulder belt and an inner surface arranged to face opposite the outer surface, the belt-travel guide is coupled to the outer surface of the belt-support foundation, and the belt-support foundation and the belt-travel guide cooperate to form a belt-receiving channel through which the shoulder belt is arranged to lie in,
a receiver anchor formed to include a loop defining a retainer-bar passageway, the headrest-retainer rod is arranged to extend through the retainer-bar passageway, and the belt receiver is coupled to the receiver anchor to move therewith back and forth about a pivot axis arranged to extend through the retainer-bar passageway relative to the seat back, and
a frictional coating coupled to the inner surface of the belt-support foundation, wherein the frictional coating is positioned to lie in spaced-apart relation to the receiver anchor to locate the belt-travel guide therebetween,
wherein a portion of the shoulder-belt cover extends through the front surface of the movable headrest and the portion of the shoulder-belt cover has a fixed length which does not change as the headrest moves up and down relative to the seat back.

30. A child restraint comprising
a juvenile seat including a seat bottom, a seat back extending upwardly from the seat bottom, movable relative to the seat bottom between a first vertical position in which the movable headrest is positioned to lie a first distance above the seat bottom and a second vertical position in which the seat bottom is positioned to lie a relatively greater second distance above the seat bottom, and a headrest lock including a headrest-retainer rod arranged to move between a locked position in which movement of the movable headrest is blocked and an unlocked position in which the movable headrest is free to move up-and-down relative to the seat back,
a child-restraint harness including a shoulder belt arranged to extend upwardly along a back surface of the seat back, over the headrest-retainer rod, and through a companion belt-travel channel formed in the seat back and a harness retainer coupled to the shoulder belt to move back and forth along the shoulder belt, and
a shoulder-belt cover including
a belt receiver including a belt-support foundation and a belt-travel guide, the belt-support foundation has an outer surface arranged to lie in confronting relation with the shoulder belt and an inner surface arranged to face opposite the outer surface, the belt-travel guide is coupled to the outer surface of the belt-support foundation, and the belt-support foundation and the belt-travel guide cooperate to form a belt-receiving channel through which the shoulder belt is arranged to lie in,
a receiver anchor formed to include a loop defining a retainer-bar passageway, the headrest-retainer rod is arranged to extend through the retainer-bar passageway, and the belt receiver is coupled to the receiver anchor to move therewith back and forth about a pivot axis arranged to extend through the retainer-bar passageway relative to the seat back, and
a frictional coating coupled to the inner surface of the belt-support foundation, wherein the frictional coating is positioned to lie in spaced-apart relation to the receiver anchor to locate the belt-travel guide therebetween,
wherein the harness retainer is arranged to lie over the belt-support foundation between the belt-travel guide and the opposite free end of the belt-support foundation when the headrest is in the first vertical position.

* * * * *